United States Patent [19]
Motoyama

[11] 4,422,107
[45] Dec. 20, 1983

[54] TAPE RECORDER CONTROL SYSTEM FOR AUTOMATICALLY REVERSING TAPE

[75] Inventor: Kazuyasu Motoyama, Hachioji, Japan

[73] Assignee: Olympus Optical Company Ltd., Tokyo, Japan

[21] Appl. No.: 378,269

[22] Filed: May 14, 1982

Related U.S. Application Data

[63] Continuation of Ser. No. 129,236, Mar. 11, 1980, abandoned.

[30] Foreign Application Priority Data

Mar. 12, 1979 [JP] Japan .................................. 54-31483

[51] Int. Cl.³ ............................................ G11B 15/00
[52] U.S. Cl. ..................................... 360/62; 360/74.1
[58] Field of Search ................. 360/71, 73, 72.1, 72.2, 360/74.1, 74.2, 74.3, 74.4, 74.5, 74.6, 74.7, 61, 62, 137; 369/23, 25, 30, 32, 33

[56] References Cited

U.S. PATENT DOCUMENTS

| | | | |
|---|---|---|---|
| 3,987,484 | 10/1976 | Bosch et al. | 360/72.2 |
| 4,015,090 | 3/1977 | Kitada | 360/62 X |
| 4,156,257 | 5/1979 | Roberts | 360/71 |
| 4,205,354 | 5/1980 | Kramer | 360/72.1 |
| 4,210,785 | 7/1980 | Huber et al. | 360/72.3 |
| 4,210,940 | 7/1980 | Prysby et al. | 369/30 X |
| 4,225,890 | 9/1980 | Takenaka et al. | 360/72.1 |
| 4,225,894 | 9/1980 | Fulukawa et al. | 360/74.1 |
| 4,301,481 | 11/1981 | Suzuki | 360/74.1 |

*Primary Examiner*—Bernard Konick
*Assistant Examiner*—Donald McElheny, Jr.
*Attorney, Agent, or Firm*—Toren, McGeady and Stanger

[57] ABSTRACT

In the disclosed system, a large scale integrated circuit receives operating signals from record, play, stop, fast-forward, and rewind actuating switches at corresponding input terminals and produce motor forward and reverse signals for controlling switches that operate a motor, fast-forward signals, and amplifier control signals at corresponding output terminals. Outside the LSI, a feedback arrangement responds to a tape-stop signal indicating that the tape has stopped advancing, and the motor forward signal produced by the large scale integrated circuit to apply play and rewind signals to the input terminals of the circuit whether or not the rewind or play switches have been operated.

4 Claims, 1 Drawing Figure

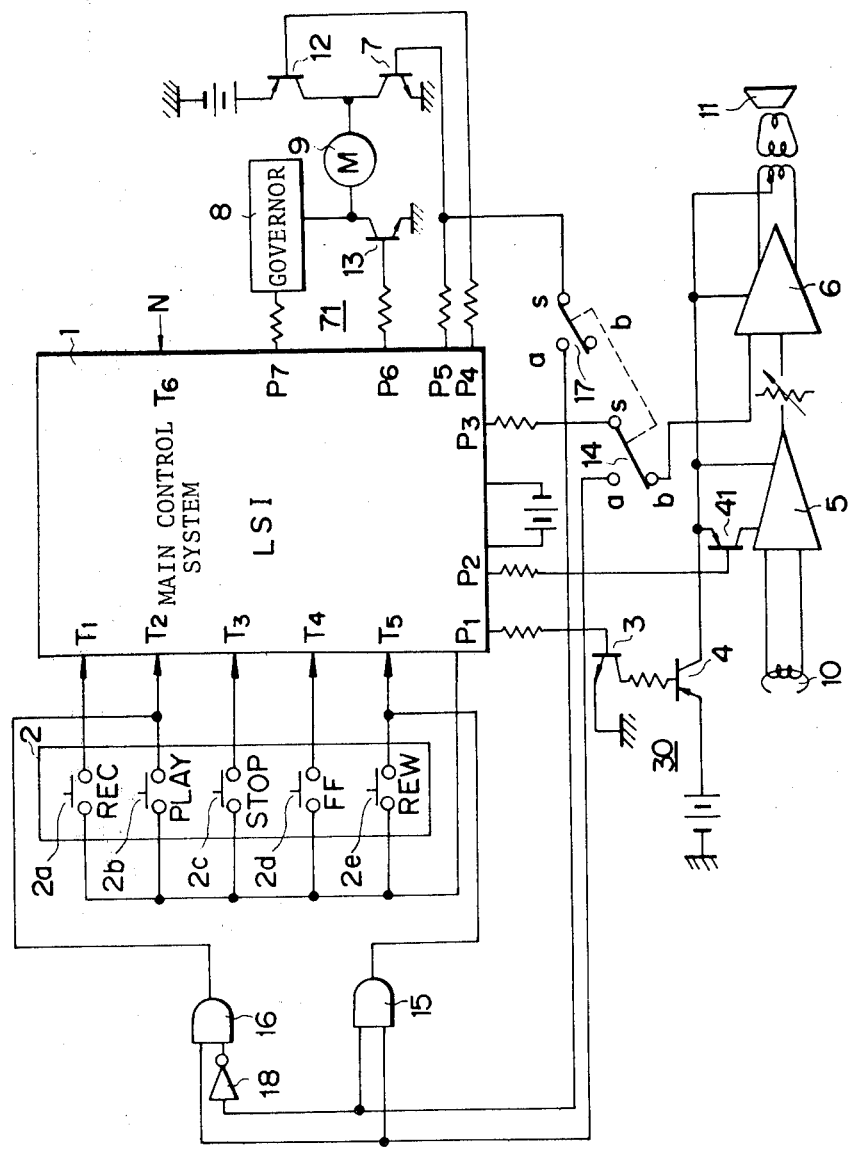

4,422,107

TAPE RECORDER CONTROL SYSTEM FOR AUTOMATICALLY REVERSING TAPE

This is a continuation of application Ser. No. 129,236 filed Mar. 11, 1980, now abandoned.

BACKGROUND OF THE INVENTION

1. Field of the Invention

The present invention relates to tape recorders employing LSI in its main control system, and more precisely, to tape recorders which offer special features such as auto-repeat, auto-reverse, etc., through the additional use of a simply designed circuit.

2. Description of Prior Art

In the past, nearly all tape recorders were in principle controlled mechanically. That is, they were designed to accomplish functions such as recording, reproducing, etc., mechanically in conjunction with the operation of the operating switches.

Because of the great number of components used for such tape recorders, however, their assembly has become extremely complicated, and the weight of the tape recorder itself has increased markedly with corresponding inconvenience of transportation.

More recently, therefore, in order to eliminate these inconveniences, a new feature has been introduced which uses LSI in its main control system. This allows functions such as recording, reproducing, etc., to be carried out electrically through the operation of the keys.

However, similar recorders have failed to add special features such as auto-repeat which automatically repeats the sequence of reproduction—tape rewinding—reproduction; or auto-reverse which continually records or reproduces AB phases of the tape, because they have LSI in the main control system which limits the scope of operation. Consequently, addition of these special features to the tape recorder required the specific re-design of the LSI itself, making it impractically expensive.

SUMMARY OF THE INVENTION

An objective of the present invention is to eliminate the above-mentioned shortcomings of the tape recorder. Another is to offer an economically advantageous tape recorder providing auto-repeat functions through the use of a simple mechanism which adds a tiny circuit to LSI, the main control system of the tape recorder.

The present invention includes a number of operating switches, operating input terminals, such as recording, reproducing, stopping, quick-tape-feeding, tape-rewinding, etc., to which operating signals are transmitted from the switches. LSI has the input terminals which receive reel signals from the tape operation running. It emits amplifier driving signals, motor forward or reverse revolution signals and tape end signals. It can activate the amplifier system of recording or reproducing circuit after receiving these signals. It can control the forward/reverse motor function after receiving the controlling motor signals; it can feed back to a given input terminal the motor forward or reverse revolution signal and tape end signal.

This feedback to a specific input terminal of the motor forward and reverse revolution signal and tape end signal by means of an operating signal, allows the tape end to go to the operating input terminal when the motor control is in reverse. This is done by the motor forward or reverse revolution signal and sends the tape end signal to the tape rewinding operation input terminal when the forward revolution control of the motor is activated by the motor forward or reverse revolution signal. A closable on-off switch permits the feed-back of the motor forward or reverse revolution signal or tape end signal to an input terminal according to what is needed. The LSI possesses an operating input terminal for reverse recording or reverse reproducing. The motor forward and reverse revolution signal and tape end signal are transmitted to an input by the operating signal and can send the tape end signal to the recording or reproducing operating input terminal when the motor reverse revolution control is activated by the motor forward or reverse revolution signal. It allows the activation of these reverse recording or reverse reproducing operating input terminals through the motor forward or reverse revolution control and its signal.

BRIEF DESCRIPTION OF THE DRAWING

The FIGURE is a circuit drawing which serves to illustrate one function of the present invention.

DESCRIPTION OF THE PREFERRED MODE OF OPERATION

In the drawing, an LSI 1 serves as the main control system of the tape recorder. The popular HA12001W, available from Hitachi Ltd., is used as the LSI. The LSI is provided with operating input terminals $T_1$–$T_5$ which emit operation signals for recording, reproducing, stopping, quick-tape-feeding, tape rewinding etc. pins $P_1$ and $P_2$ which send amplifier activating signals in accordance with the operating signals from input terminals $T_1$–$T_5$, and pins $P_4$, $P_5$, $P_6$, and $P_7$. These emit the motor forward or reverse revolution signals to input terminal $T_6$ which receives a reel revolution signal N that emanates from the reel operation, as well as pin $P_3$ which emits tape end signals. That is, the recording operation signal is applied to input terminal $T_1$. The LSI 1 causes pin $P_1$, $P_4$, $P_5$, $P_7$ to generate an output H (high level output) and $P_2$, $P_6$ to generate an output L (low level output). It causes pin $P_1$, $P_2$, $P_4$, $P_5$, $P_7$ to generate an output H, and pin $P_6$ to generate an output L when the input terminal $T_2$ receives the reproducing operation signal. It causes pin $P_2$, $P_4$, and $P_5$ to generate output H while pin $P_1$, $P_6$ and $P_7$ generate output L when input terminal $T_4$ is given a tape quick feeding operation signal.

It causes pin $P_2$ and $P_6$ to generate an output H when input terminal $T_5$ is sent a tape rewinding operation signal and pin $P_1$, $P_5$ and $P_7$ to generate output L. LSI is constructed to cause pin $P_3$ to generate output H when the reel revolution signal N stops in input terminal $T_6$ along with the tape end. Input terminals $T_1$–$T_5$ are connected with keyboard switch 2. The keyboard switch 2 possesses, for example, touch system recording operation switch 2a, reproducing operation switch 2b, stop operation switch 2c, tape quick feeding operation switch 2d and tape rewinding operation switch 2e.

The operating switch 2a is connected to input terminal $T_1$; operating switch 2b to input terminal $T_2$; operating switch 2c to input terminal $T_3$; operating switch 2d to input terminal $T_4$, and operating switch 2e to input terminal $T_5$.

Pin $P_1$ and $P_2$ of LSI 1 are connected to amplifier driving circuit 30. Amplifier driving circuit 30 serves to control, for example, the amplifier circuit which includes preamplifier 5, main amplifier 6, head 10 and speaker 11. It consists of transistor 3, 4, and 41 and is designed to turn transistor 3 and 4 by means of output H from pin $P_1$ in the reproducing operation, and powers the preamplifier 5 and main amplifier 6. It receives the reproducing output from head 10 to speaker 11 through amplifiers 5 and 6 so that the reproduction may be attained. It goes without saying that, although now shown in the drawing, amplifier driving circuit 30 serves to power the amplifier system in the recording circuit in the recording process. In this case, output from pin $P_2$ (output L) turns the current on in transistor 41 for acquiring the bias signal which is necessary for recording.

Pin $P_4$, $P_7$ of LSI1 are connected with control circuit 71 of the motor forward or reverse revolution system. Control circuit 71 contains transistors 12 and 13, electron governor 8, motor 9, and turns the current on in transistor 7 by means of output L from pin $P_6$ and pin $P_4$, $P_5$ and $P_7$ (H output) in the course of recording or reproducing. It causes motor 1 to revolve at the rated speed in the forward direction by means of electron governor 8, turns the current on in transistor 7 by means of output H from pin $P_4$ and $P_5$, and output L from pin $P_6$ and $P_7$ during the tape quick feeding operation. It releases electron governor 8 from its operation so as to cause motor 9 to revolve at a high forward rate and turns the current on in transistors 12 and 13 by means of output L from pin $P_4$, $P_5$ and $P_7$, and output H from pin $P_6$ during the tape rewinding operation so as to cause motor 9 to move forward at a high rate of speed.

Pin $P_3$ of LSI 1 is connected to main amplifier 6 by contact S-b of switch 14 and at the same time is connected to one of the input terminals of "and" gates 15 and 16 via contact S-a of that switch. Meanwhile pin $P_5$ of LSI is connected with the other input terminal of "and" gate 15 by contact S-a of the switch and to the other input terminal of "and" gate 16 through inverter 18. In this case, switches 14 and 17 are interlocked. The output terminal of "and" gate 15 is connected to the input terminal $T_5$ of LSI 1 and the output terminal of "and" gate 16 is connected to input terminal $T_2$ of LSI 1.

The tape recorder is illustrated as follows in terms of performance.

Here, turning regenerative operation switch 2b on causes high outputs H to be generated in LSI 1 pins, $P_2$, $P_4$, $P_5$, $P_7$, and output L at $P_6$. The H output in pin $P_1$ causes transistors 3 and 4 in the amplifier driving circuit to be powered, preamplifier 5 and main amplifier 6 are also powered and the generative output of head 10 is supplied to speaker 11 via amplifier 5 and 6. At the same time, output H from pin $P_4$, $P_5$ and $P_7$ combines with the output from pin $P_6$ to turn the current on in transistor 7 in the motor forward and reverse control circuit 71, and causes motor 9 to turn forward at the rated speed, thus leading to the generative performance attained.

In this case, reel turning signal N which results from the tape feeding is supplied to input terminal $T_6$ of LSI 1, and, subsequently, when the tape rewinding is over and reel turning signal N cases, output H occurs in pin $P_3$ as the tape end signal. Then the signal is supplied to main amplifier 6 with the result of an end alarm being emitted from speaker 11. The "on" operation of tape rewinding switch 2e leads to the generation of output H in pin $P_2$ and $P_6$ of LSI 1, and output L, in pin $P_1$, $P_4$, $P_5$ and $P_7$. Output L in pin $P_1$ will turn the current off in transistor 3 and 4, cutting the current to amplifier 5 and 6, while at the same time, output L in pin $P_4$ and $P_5$, and output H in pin $P_6$ will turn the current on in transistor 12 and 13, causing motor 9 to revolve at high speed in the reverse direction until the tape is rewound. Here, the tape rewinding, when completed, will be as seen above, followed by the generation of the tape end signal of pin $P_3$ 1="H".

Thus generative operation switch 2b and tape rewinding switch 2e will be alternately operated to repeat the reproducing and rewinding performances. The so-called auto-repeat that enables the carrying out of the reproduction and tape-rewinding process automatically and repeatedly is available in the following sequence.

The continual operation of switch 14 and 17 leads to the closing of contact S-a. Thus the previously described operation of generative operation switch 2b leads to the generative performance. Thereafter, when the tape rewinding is over, output H occurs in pin $P_3$ of LSI 1, since the generation allows pin $P_5$ to produce output H which is supplied as an equivalent signal for the performance of tape rewinding operation switch 2e to input terminal $T_5$ of LSI 1, and thereby causes output L to be generated in pin $P_1$ of LSI 1 while simultaneously giving rise to output L in pin $P_4$ and $P_5$, and output H in pin $P_6$. Hence the current to amplifier 5 and 6 will be turned off and at the same time transistor 12 and 13 are powered and motor 9 is caused to revolve in the reverse direction and tape rewinding is carried out.

Subsequently, the tape rewinding is completed and permits pin $P_3$ of LSI 1 to generate output H. Since the tape rewinding permits the generation of output L in pin $P_5$ of LSI 1, while "and" gate 16 generates output H which is supplied to input terminal $T_2$ of LSI 1 as an equivalent signal as the performance of generative operation switch 2b. So, LSI 1 again switched to generative performance. Thereafter, the similar repetition of the performance of reproduction—tape rewinding—reproduction will automatically lead to auto-repeat performance.

Consequently such a mechanism will enable the popular LSI to carry out the auto-repeat performance by utilizing the LSI tape end signals and motor forward or reverse revolution signals which feed back to the predetermined input terminals can be offered.

The present invention is by no means limited to these examples of uses, but can be modified within the scope of the original conception. For example, auto-reverse can be effected, as well as continual reproduction of AB tape sides if the LSI 1 having reverse recording ability or reverse reproducing ability is employed. A continual recording on tape AB face will become feasible by providing the recording operation input terminal with the output from "and" gate 16, and the reverse recording operation input terminal with output from "and" gate 15. Continual reproduction and auto-reverse performance will be obtained through the supply of the output from "and" gate 15 to the reverse reproduction operative input terminal while supplying output from "and" gate 16 to the generative operation input terminals.

What is claimed is:

1. For a tape recorder capable of producing a tape-stop signal indicating that tape feed has stopped, a control system, comprising:
   a motor for driving reels;
   a plurality of switches including a recording switch to actuate a recording function for producing recording input signals, a reproducing switch to actuate a reproducing function for producing reproducing input signals, a stop switch to actuate a stopping function for producing stopping input signals, a fast forward switch to actuate a fast forward tape feed function for producing fast forward input signals, and a rewind switch to actuate a rewind function for producing rewind input signals;

an LSI circuit having a plurality of input terminals each connected to one of said switches for receiving the respective input signals and having an input terminal for receiving tape-stop signals;

said LSI circuit being responsive to the signals at the input terminals for producing recording and reproducing output signals, motor forward and reverse output signals, and tape-stop output signals in response to the tape-stop signals, said LSI circuit having a plurality of output terminals at which respective ones of said output signals appear;

recording and reproducing means responsive to the recording and reproducing output signals for recording and reproducing data;

power switch means coupled to the output terminals and responsive to said motor forward and reverse output signals for supplying power to the motor in response to the motor forward and reverse output signals; and feedback means outside the LSI circuit and external to the terminals thereof and responsive to the stop-tape output signals and coupled to the input terminal connected to the rewind switch.

2. A tape recorder as in claim 1, wherein the feedback means includes means for selectively feeding the motor forward and reverse output signals to the input terminals connected to the play and rewind input switches.

3. A tape recorder as in claim 1, wherein said feedback means includes manually operable switches for enabling and disabling said feedback means.

4. A tape recorder as in claim 1, wherein said feedback means includes a first AND gate for ANDing the motor forward and reverse output signals with the tape-stop output signals and applying the ANDed output thereof to the input terminal connected to the rewind input switch and for ANDing the complement of the motor forward and reverse signals with the tape-stop output signals and applying the output thereof to the input terminal connected to the reproducing switch.

* * * * *